(12) United States Patent
Ferri et al.

(10) Patent No.: US 7,975,270 B2
(45) Date of Patent: Jul. 5, 2011

(54) FACILITATING ALLOCATION OF RESOURCES IN A HETEROGENEOUS COMPUTING ENVIRONMENT

(75) Inventors: Richard C. Ferri, Ulster Park, NY (US); Moon J. Kim, Wappingers Falls, NY (US); Dikran S. Meliksetian, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1832 days.

(21) Appl. No.: 10/798,108

(22) Filed: Mar. 10, 2004

(65) Prior Publication Data
US 2005/0204040 A1    Sep. 15, 2005

(51) Int. Cl.
G06F 9/46 (2006.01)
G06F 15/173 (2006.01)
G06F 7/38 (2006.01)

(52) U.S. Cl. ......... 718/104; 709/225; 709/226; 712/229

(58) Field of Classification Search .................. 718/104; 709/226
See application file for complete search history.

(56) References Cited

U.S. PATENT DOCUMENTS

| | | |
|---|---|---|
| 4,564,903 A | 1/1986 | Guyette et al. |
| 4,660,144 A | 4/1987 | Walsh |
| 4,843,541 A | 6/1989 | Bean et al. |
| 5,175,679 A | 12/1992 | Allen et al. |
| 5,307,495 A | 4/1994 | Seino et al. |
| 5,473,773 A | 12/1995 | Aman et al. |
| 5,506,975 A | 4/1996 | Onodera |
| 5,564,040 A | 10/1996 | Kubala |
| 5,659,786 A | 8/1997 | George et al. |
| 5,675,739 A | 10/1997 | Eilert et al. |
| 5,784,702 A | 7/1998 | Greenstein et al. |
| 6,199,095 B1 * | 3/2001 | Robinson ............ 718/107 |
| 6,247,109 B1 | 6/2001 | Kleinsorge et al. |
| 6,366,945 B1 * | 4/2002 | Fong et al. ............ 718/104 |
| 6,587,938 B1 | 7/2003 | Eilert et al. |
| 6,597,956 B1 | 7/2003 | Aziz et al. |
| 6,788,980 B1 | 9/2004 | Johnson |
| 6,978,455 B1 | 12/2005 | Borkowski et al. |

(Continued)

FOREIGN PATENT DOCUMENTS

EP    0473913 A    3/1992

(Continued)

OTHER PUBLICATIONS

"Managing Processing Within Computing Environments Including Initiation of Virtual Machines," Bulson et al., U.S. Appl. No. 10/667,163, filed Sep. 17, 2003.

(Continued)

Primary Examiner — Emerson C Puente
Assistant Examiner — Camquy Truong
(74) Attorney, Agent, or Firm — John E. Campbell; Blanche E. Schiller, Esq.; Heslin, Rothenberg, Farley & Mesiti P.C.

(57) ABSTRACT

Allocation of resources in a heterogeneous computing environment is facilitated. A resource manager of the heterogeneous computing environment obtains information that describes which nodes of the heterogeneous computing environment are capable of supporting additional operating systems and platforms over and above their native operating systems and platforms. This information is then used by the resource manager in allocating resources to satisfy a particular job.

18 Claims, 6 Drawing Sheets

U.S. PATENT DOCUMENTS

| | | | |
|---|---|---|---|
| 6,985,951 | B2 | 1/2006 | Kubala et al. |
| 6,996,614 | B2 | 2/2006 | Hallinan et al. |
| 7,146,233 | B2 | 12/2006 | Aziz et al. |
| 7,162,617 | B2 * | 1/2007 | Ota et al. ............... 712/229 |
| 7,272,799 | B2 | 9/2007 | Imada et al. |
| 7,299,466 | B2 | 11/2007 | Pulsipher et al. |
| 7,421,708 | B2 * | 9/2008 | Vass et al. ............... 719/320 |
| 7,426,749 | B2 * | 9/2008 | Gerard ............... 726/22 |
| 7,519,800 | B2 * | 4/2009 | Michaelis ............... 713/1 |
| 7,574,346 | B2 * | 8/2009 | Bond et al. ............... 703/26 |
| 2001/0039581 | A1 * | 11/2001 | Deng et al. ............... 709/226 |
| 2005/0060702 | A1 | 3/2005 | Bennett et al. |

FOREIGN PATENT DOCUMENTS

| | | |
|---|---|---|
| JP | 08235112 | 9/1996 |
| JP | 08241277 | 9/1996 |
| JP | 2000315192 | 11/2000 |
| JP | 2001219618 | 8/2001 |
| JP | 2002251292 | 9/2002 |
| JP | 2002261818 | 9/2002 |
| WO | 0229598 A1 | 4/2002 |

OTHER PUBLICATIONS

"Binary Compatibility," //gcc.gnu.org/onlinedocs/gcc/Compatibility.html, pp. 1-3.

"SOAP Version 1.2 Part 0: Primer", Nilo Mitra, w3.org/TR/2003/REC-soap12-part0-20030624/, pp. 1-52.

International Search Report and Written Opinion for PCT/EP2004/051499, Jan. 12, 2005.

Hand et al., "Controlling the XenoServer Open Platform," Mar. 2003, pp. 1-9, University of Cambridge Computer Laboratory.

Barham et al., "Xen 2002," Jan. 31, 2003, University of Cambridge Computer Laboratory, UCAM-CL-TR-553.

Silberschatz et al., "Operating System Concepts", 1999, John Wiley & Sons, Inc., Fifth Edition, pp. 74-77, 155-158, 167-168 and 207-209.

Software-Practice & Experience, 32(2) 2002.02. John Wiley & Sons Inc., Klaus Krauter et al., "A taxonomy and survey of grid resource management systems for distributed computing," pp. 135-164, 2001.

"CP Command and Utility Reference," IBM Publication No. SC24-6008-03, Fourth Edition, May 2002, pp. 1764-1783.

"Resource Access Control Facility Command Language Reference," IBM Publication No. SC28-0733-16, Version 1, Release 10, Seventeenth Edition (Sep. 1997).

"Directory Maintenance Facility Function Level 410 Command Reference," IBM Publication No. SC24-6025-03, Fourth Edition, Oct. 2002.

"z/VM—General Information," IBM Publication No. GC24-5991-04, Fifth Edition, Apr. 2002.

"z/VM—Running Guest Operating Systems," IBM Publication No. SC24-5997-02, Third Edition, May 2002.

"z/Architecture—Principles of Operation," IBM Publication No. SA22-7832-00, First Edition, Dec. 2000.

Office Action for U.S. Appl. No. 10/667,163 dated Feb. 24, 2007.

Final Office Action for U.S. Appl. No. 10/667,163 dated Jan. 16, 2008.

Office Action for U.S. Appl. No. 10/667,163 dated May 12, 2008.

* cited by examiner

FACILITATING ALLOCATION OF RESOURCES IN A HETEROGENEOUS COMPUTING ENVIRONMENT

CROSS-REFERENCE TO RELATED APPLICATIONS

This application contains subject matter which is related to the subject matter of the following application, which is assigned to the same assignee as this application and hereby incorporated herein by reference in its entirety:

"MANAGING PROCESSING WITHIN COMPUTING ENVIRONMENTS INCLUDING INITIATION OF VIRTUAL MACHINES," Bulson et al., Ser. No. 10/667,163, filed Sep. 17, 2003, ABANDONED.

TECHNICAL FIELD

This invention relates, in general, to heterogeneous computing environments, and in particular, to facilitating the allocation of resources in a heterogeneous computing environment.

BACKGROUND OF THE INVENTION

A heterogeneous computing environment includes a plurality of nodes having different architectures and operating systems. For instance, at least one node of the environment is based on a different architecture executing a different operating system than at least one other node of the environment. One example of a heterogeneous computing environment is a grid computing environment.

A grid computing environment includes a number of nodes, such as workstations or servers, that cooperate to solve large computing problems. Typically, a grid is spread out over a large geographic area. Individual nodes that contribute to the grid may have many other alternate purposes—at various times, they may be used as nodes within a cluster or as individual workstations, as well as grid members. Typically, the decision to make an individual node or group of nodes available to the grid is based on a number of items, including how busy the node is in its non-grid roles, the demand for grid nodes, and the types of resources dedicated to the node. These resources, such as storage, memory, compute power and file system resources, can be allocated to the greater grid in order to create a powerful, dynamic, problem solving environment.

In the current state of the art, there is a strong affinity between the grid node and the characteristics of the job to be executed on that node. In particular, the node selected to run the job or a portion thereof is to have the correct version of the operating system and the correct platform architecture (i.e., the correct environment). This is a result of the job having bound executable files that are compiled and linked for a particular operating system on a particular platform. For example, the executable files contain machine level instructions which can only run on machines of the same environment. This shortcoming restricts the grid to allocate resources of only those nodes having the same environment as the job to be executed.

Previously, attempts have been made to overcome this shortcoming. However, a need still exists for a capability that facilitates allocation of resources in a heterogeneous computing environment.

SUMMARY OF THE INVENTION

The shortcomings of the prior art are overcome and additional advantages are provided through the provision of a method of facilitating allocation of resources in a heterogeneous computing environment. The method includes, for instance, obtaining, by a resource manager of the heterogeneous computing environment, one or more attributes relating to one or more nodes coupled to the resource manager, the one or more attributes specifying at least one compatible environment supported by the one or more nodes; and taking into consideration, by the resource manager, at least one attribute of the one or more attributes in allocating one or more resources of at least one node of the one or more nodes to a request.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided to facilitate allocation of resources in a heterogeneous computing environment. The heterogeneous environment includes at least one resource manager that is responsible for determining which nodes of the environment can process a particular request. To make this determination, previously, the resource manager would consider those nodes having the same environment (i.e., architecture and operating system) as the request. Further, as an enhancement, the resource manager could also consider nodes of different generations of the same architecture as the request, as described in co-pending patent application Ser. No. 10/667,163, entitled "Managing Processing Within Computing Environments Including Initiation Of Virtual Machines," filed Sep. 17, 2003.

With one or more aspects of the present invention, the scope of nodes to be considered to process a particular request is greatly expanded. For example, nodes can be considered that have different native environments than the request. These heterogeneous nodes can be considered, since they are capable of supporting other environments, although their native environments are different than the request.

The resource manager of the heterogeneous computing environment obtains information from the various nodes in the environment and uses that information to determine which nodes can be used to process a request. The information obtained by the resource manager includes attributes relating to the one or more environments (e.g., platforms and operating systems) that are supported by but not native to the nodes. These compatibility attributes are made available to the resource manager to broaden the scope of nodes, and therefore, resources, available to process a specific request.

Figure 1:
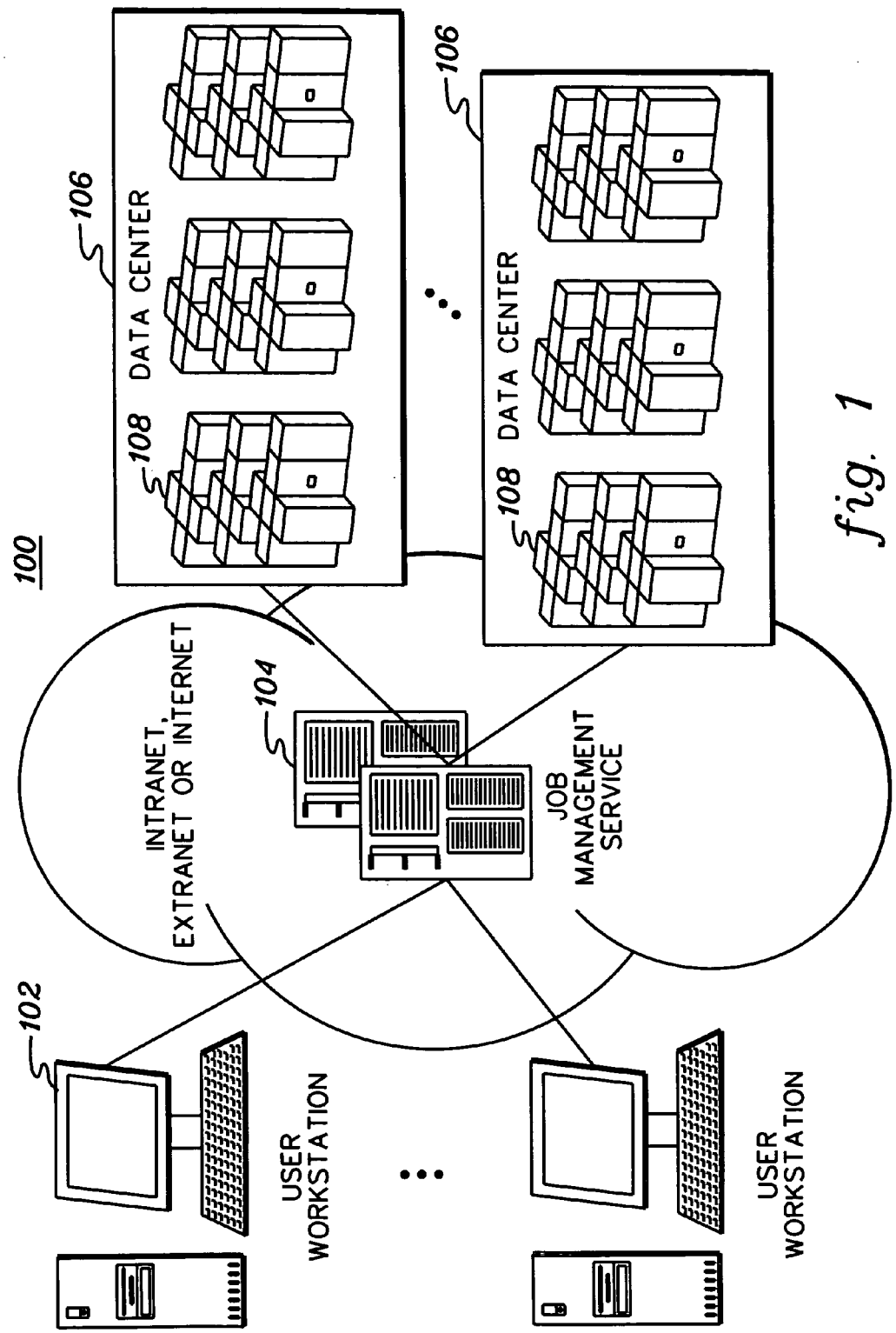
FIG. 1 depicts one embodiment of a heterogeneous computing environment incorporating and using one or more aspects of the present invention.

One example of a heterogeneous computing environment is depicted in FIG. 1. In this example, the heterogeneous environment is a grid computing environment 100 including, for instance, a plurality of user workstations 102 (e.g., laptops, notebooks, such as ThinkPads, personal computers, RS/6000's, etc.) coupled to a job management service 104 via, for instance, the internet, extranet, or intranet. Job management service 104 includes, for instance, a web application to be executed on a web application server, such as Websphere offered by IBM®, or distributed across a plurality of servers. It has the responsibility for accepting user requests and passing the requests to the appropriate nodes of the environment. As one example, a user interacts with the job management service via a client application, such as a web browser or a standalone application. There are various products that include a job management service, including, for instance, LSF offered by Platform, and Maui, an open source scheduler (IBM® is a registered trademark of International Business Machines Corporation, Armonk, N.Y., U.S.A. Other names used herein may be registered trademarks, trademarks or product names of International Business Machines Corporation or other companies.)

Job management service 104 is further coupled via the internet, extranet or intranet to one or more data centers 106. Each data center includes, for instance, one or more nodes 108, such as mainframes, workstations and/or servers. The nodes of the environment are heterogeneous nodes in that at least one node is based on a different architecture and/or is executing a different operating system than at least one other node. For example, one node may be based on the x86 architecture running a Linux operating system and another node may be based on the PowerPC architecture running AIX.

Figure 2:
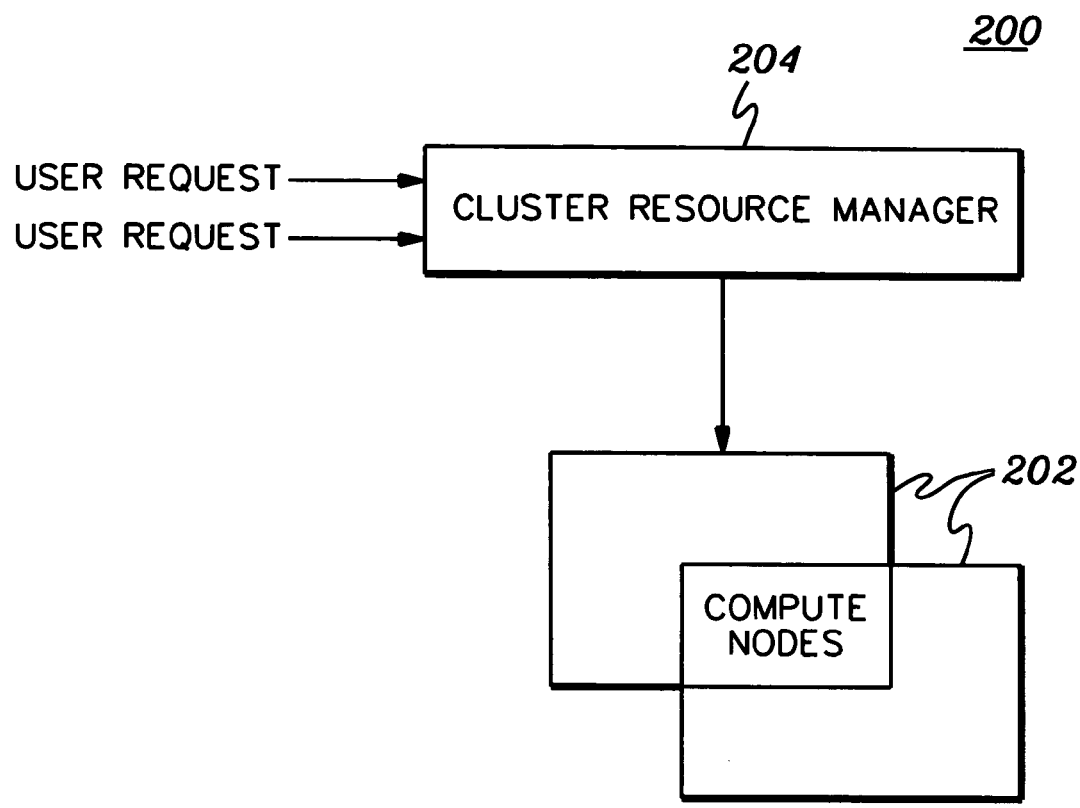
FIG. 2 depicts one example of a cluster that may be employed in the heterogeneous computing environment of FIG. 1, in accordance with an aspect of the present invention.

As described herein, a grid computing environment includes a plurality of nodes which cooperate to solve a large computing problem. Individual nodes that contribute to the grid may have many other alternate purposes. For example, nodes within the grid may be used as individual workstations or form a cluster, an example of which is depicted in FIG. 2. A cluster 200 includes, for instance, a set of homogeneous nodes 202, which are managed by a resource manager 204, such as a cluster resource manager. The cluster resource manager receives requests from users and is responsible for allocating cluster resources to the individual requests. The manner in which the resources are allocated depends on the requirements (e.g., storage, CPU requirements, etc.) of the request. It is the responsibility of the cluster resource manager to use the resources efficiently to maximize throughput. An example of a cluster resource manager is Loadleveler, offered by International Business Machines Corporation, Armonk, N.Y.

Figure 3:
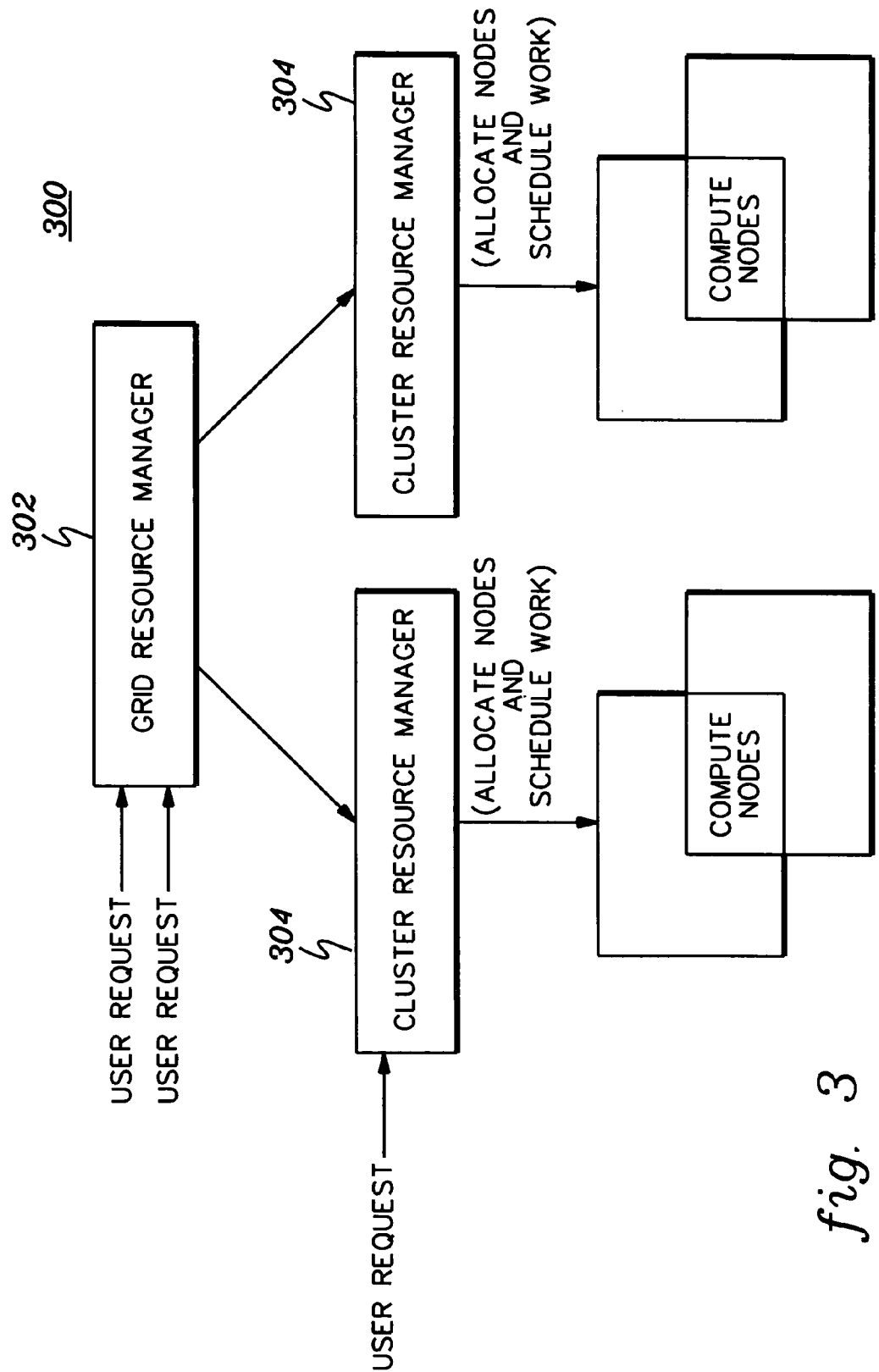
FIG. 3 depicts one example of a plurality of clusters of a grid computing environment, in accordance with an aspect of the present invention.

One or more clusters may be coupled together to form a grid computing environment. In a grid environment, an additional layer of software is added which allocates nodes to the greater grid, as shown in FIG. 3. A grid computing environment 300 includes a job management service, such as a grid resource manager 302, which is coupled to a plurality of cluster resource managers 304 of a plurality of clusters. A request is submitted to the grid resource manager, and the grid resource manager is aware of one or more sets of nodes, each of which may have different architectures and operating systems. It is from this pool of architectures and operating systems that the grid resource manager draws on when evaluating available resources for a grid request. For example, if a grid request (e.g., a job or a portion thereof) is submitted which is a Linux executable compiled for an x86 cluster, the grid manager only considers the set of nodes that exactly satisfy these conditions to select candidate resources. This shortcoming is illustrated in FIG. 4, wherein a large number of resources might stand idle because of the operating system and architecture constraints of the submitted request.

Figure 4:
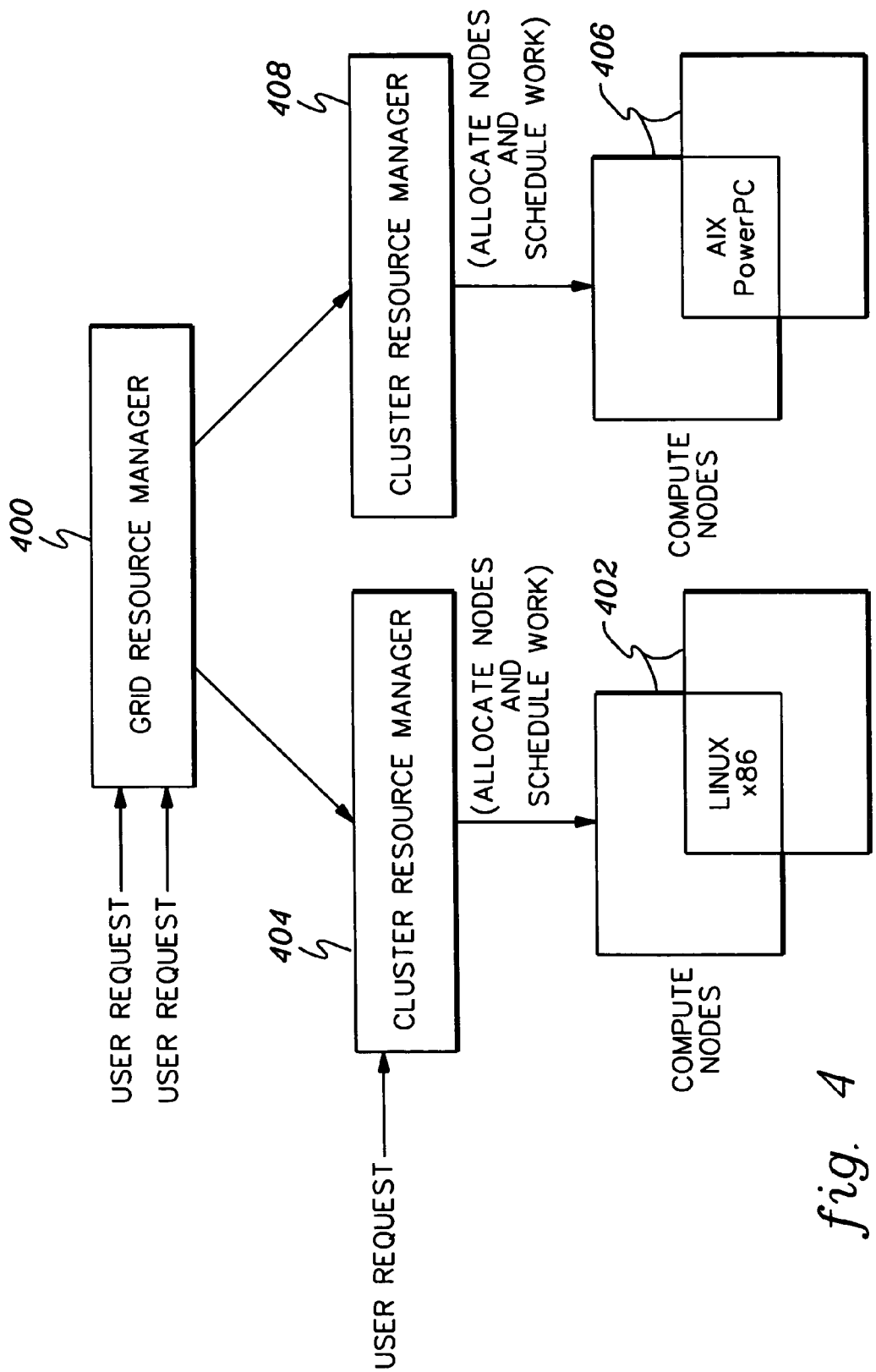
FIG. 4 depicts one embodiment of a grid computing environment in which the resources available to the grid are restricted.

Referring to FIG. 4, a grid resource manager 400 only considers compute nodes 402 coupled to cluster resource manager 404, since the grid resource manager is aware that those nodes have the same environment as the executable to be run. That is, the Linux executable compiled for an x86 cluster can run on those nodes, since they are based on the x86 architecture and are executing the Linux operating system. Nodes 406, managed by a cluster resource manager 408, running an AIX operating system on a PowerPC architecture are not considered for resource allocation, since they are not the same environment as the submitted executable.

However, in accordance with an aspect of the present invention, nodes 406 may be considered. That is, a capability is provided to enable a grid resource manager to consider additional nodes, if those nodes can support further operating systems and architectures. For example, it is possible that although one or more nodes of a grid are native to one environment (i.e., have a particular hardware platform and operating system), that they may also be able to support other environments. For instance, a node that has a native operating environment of PowerPC executing AIX may be able to support an environment of x86 running Linux. Thus, that node can process requests (e.g., execute programs) that require either environment, as indicated by the request either explicitly or implicitly.

In order for a request to be executed on a node that is not native to the request, the request is moved to the other environment. For example, if the request is to run a program, the program, which is written for the native environment, is moved to the other environment. Techniques exist for moving a program from one environment and making it executable in another environment. One such technique includes using an application programming interface (API). Programs access operating system routines, such as reading and writing files, through a series of well defined operating system functions defined in an API. A well constructed program written in a high level programming language, such as the C programming language, can easily be ported from one operating system to another if both operating systems support the same API. For example, a program written in C with a number of API calls might run on an AIX operating system, but could be ported to run on Linux, if Linux supports the same set of APIs that AIX does. The same could hold true in porting an application from an x86 (Intel 32 bit) platform to a 64 bit platform—if an API is provided, the program should port rather easily.

The drawback of APIs is that they are programming interfaces, and require a recompile of code to port the application from one environment to another. Again, going back to the example of a C program running in AIX, the same program would require a recompile in a Linux environment, using the Linux APIs, to make the program execute successfully under Linux. This concept of forcing a recompile for each program that is ported from one environment to another is time consuming, and sometimes, uncovers hidden flaws in the API. Thus, other techniques have been sought.

One technique, referred to as ABI or Application Binary Interface, provides a more straightforward technique for running a program in a different environment. ABI provides a technique of taking an executable from one environment and running it in another environment without recompilation through the use of an emulation software layer or through direct hardware support on a target machine. One architecture that uses ABI is the AMD64 architecture, offered by AMD, Sunnyvale, Calif. An example of ABI is described in "Binary Compatibility," the content of which is hereby incorporated herein by reference in its entirety.

In accordance with an aspect of the present invention, nodes that are capable of supporting different architectures, such as those that are ABI capable, are exposed to the grid resource manager, so that the grid resource manager can use this information when allocating tasks to the individual clusters or nodes. This enables a wider group of nodes to become available to the greater grid.

Figure 5:
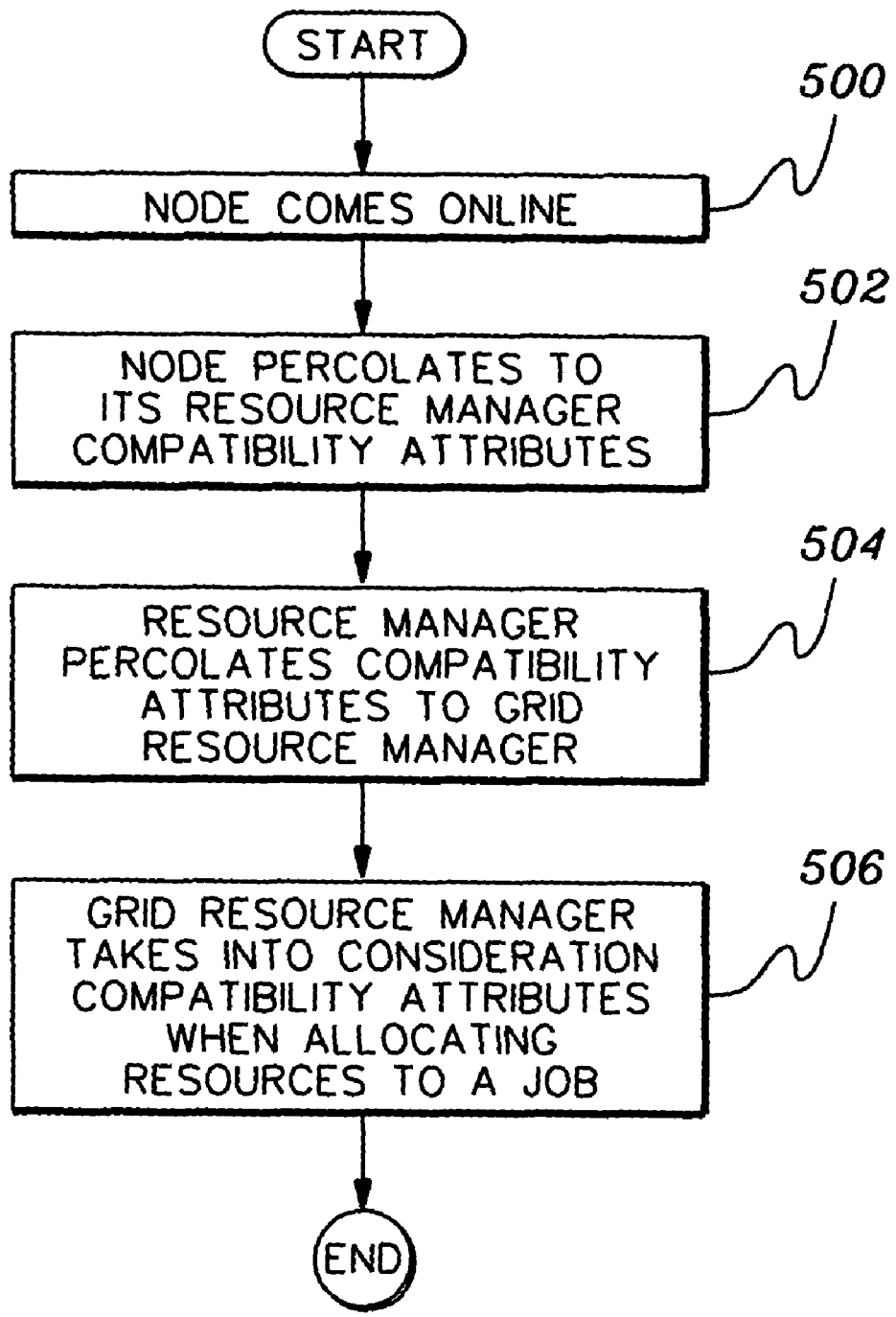
FIG. 5 depicts one embodiment of the logic associated with providing additional resources to the grid, in accordance with an aspect of the present invention.

On embodiment of the logic associated with exposing the different capabilities to the grid resource manager, which is then capable of using this information in its resource allocation, is described with reference to FIG. 5.

When a node, such as a workstation, comes online, STEP 500, it provides a set of attributes to its resource manager, such as the cluster resource manager, STEP 502. These attributes include, as examples, the platform (architecture) of the node; the operating system and operating system level of the node; as well as a set of compatibility attributes, including, for instance, any additional operating systems and/or any additional platforms (architectures) supported by the node through, for instance, ABI. This information is provided to the cluster resource manager via, for instance, Web Services Calls or Web Services Notifications. For instance, an XML document specifying these attributes is transferred to the cluster resource manager using Web Services Calls or Notifications, such as a SOAP call. One example of SOAP is described in "SOAP Version 1.2 Part 0: Primer," Nilo Mitra, the content of which is hereby incorporated herein by reference in its entirety.

The cluster resource manager receives this information and percolates at least the compatibility attributes of the node (e.g., one or more non-native environments that it supports) to the grid resource manager, STEP 504. In one example, this information is provided to the grid resource manager using a similar mechanism as used to forward the information from a node to the cluster resource manager. For instance, the compatibility attributes are provided via a Web Services Call, such as a SOAP call, to a Web Service exposed by the grid resource manager. Although an example for providing the information is given herein, many other communications media are possible. The grid resource manager then takes these attributes into consideration when allocating resources to a request, STEP 506.

Figure 6:
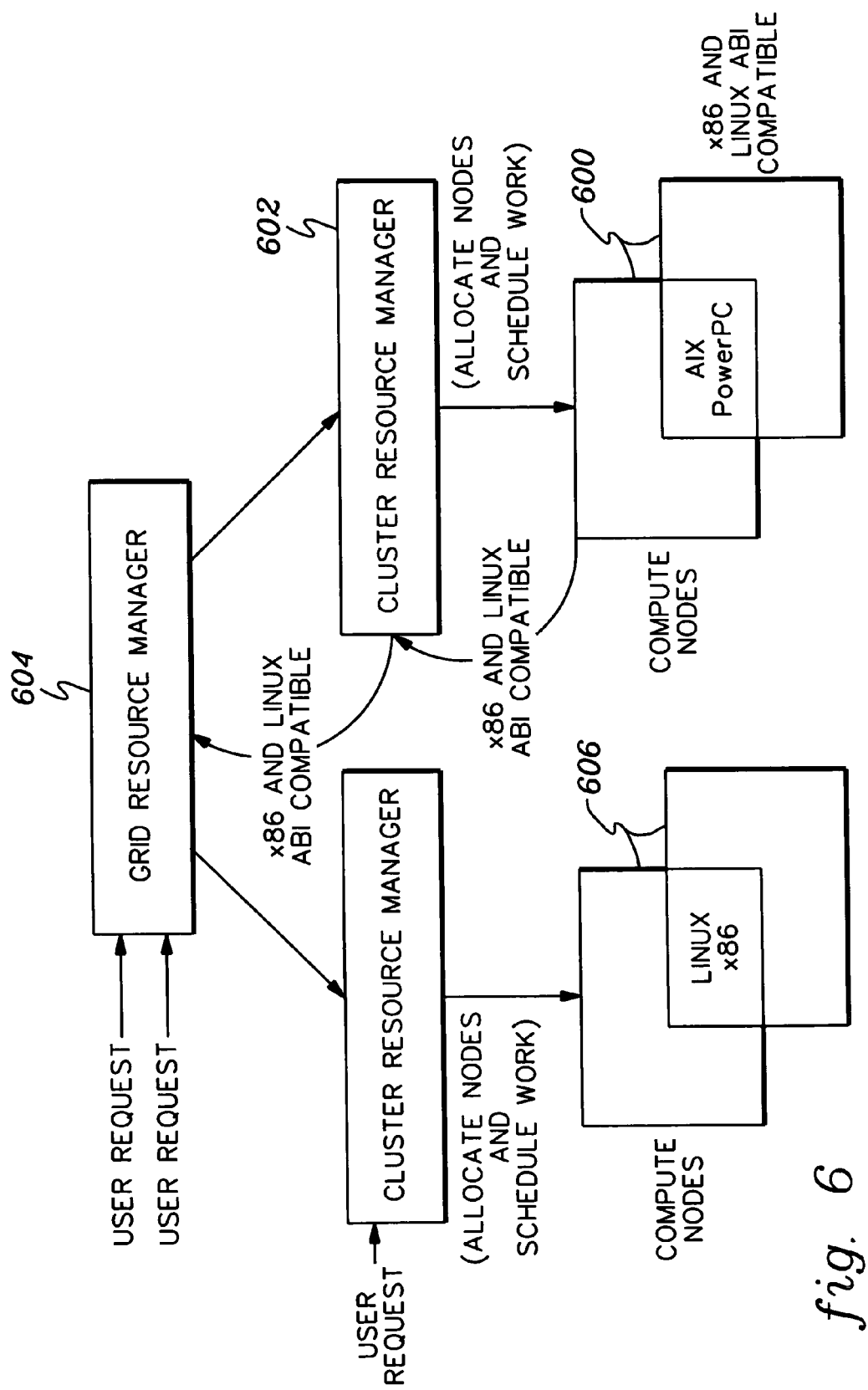
FIG. 6 depicts one embodiment of a grid computing environment in which additional resources are available to the grid for allocation, in accordance with an aspect of the present invention.

FIG. 6 depicts a pictorial illustration of the grid resource manager obtaining the compatibility attributes, such that the grid resource manager can use those attributes in allocating resources. As shown in FIG. 6, compute nodes 600 each have a native environment of AIX and PowerPC, but are x86 and Linux ABI compatible. The nodes provide this information to their cluster resource manager 602. The cluster resource manager then percolates this information up to grid resource manager 604. Thus, when the grid resource manager receives a request for a Linux executable, it can consider nodes 606, as well as nodes 600 when determining how to allocate the resources. For example, it can send queries to managers on nodes 600 and 606 to see if those nodes have the needed resources. If one or more of the nodes have the resources, then at least one of the nodes is selected to process the request.

Described in detail above is a capability for facilitating allocation of resources in a heterogeneous computing environment. A resource manager, such as a grid resource manager, obtains information that identifies which nodes in the heterogeneous environment are able to support additional operating systems and platforms. The resource manager then uses this information to determine how to allocate resources. This advantageously expands the number of resources available to the heterogeneous computing environment for a particular request.

Although one example of a heterogeneous computing environment is described herein, many variations to the environment are possible without departing from the spirit of one or more aspects of the present invention. For instance, environments other than grid environments can incorporate and use one or more aspects of the present invention. As an example, any heterogeneous environment that uses an entity, such as a resource manager, to allocate resources can benefit from one or more aspects of the present invention. For instance, clusters having heterogeneous nodes, as well as other environments in which a manager manages a group of heterogeneous nodes, can use one or more aspects of the present invention. As a further example, the grid resource manager and the cluster resource manager are just examples of managers that can be used in accordance with one or more aspects of the present invention. Other types of managers can be used. Further, although examples of grid and cluster resource managers are provided, other alternatives exist. For instance, other applications or processes can be used.

As further examples, nodes can be different classes than that described herein (e.g., other than mainframes, workstations or servers) and/or can support different environments. Many environments (e.g., architectures and/or operating systems) are capable of using one or more aspects of the present invention. Further, a heterogeneous environment that includes a node having the same architecture but a different generation as another node can incorporate one or more aspects of the present invention. Additionally, various types of interfaces, other than ABI, may also be used to move jobs to different environments. Moreover, various mechanisms may be used to percolate the compatibility attributes from the nodes to the grid resource manager or other manager.

As yet another example, the user can be replaced by an automated service or program. Further, a single request or job may include multiple jobs that run simultaneously on multiple nodes. This is accomplished similarly to that described above. For instance, the grid resource manager contacts a plurality of cluster managers and has those managers manage the plurality of requests. Many other variations also exist. As a further example, the environment may include one or more nodes that are partitioned. As yet a further example, one or more aspects of the present invention apply to Plug Compatible Machines (PCM) from Hitachi. Other examples are also possible.

Despite the type of environment, advantageously, one or more aspects of the present invention enable the harnessing of unutilized compute power which provides immediate economic benefits to an organization that has a large installed base of nodes.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating allocation of resources in a heterogeneous computing environment comprising a plurality of nodes, said method comprising:
    obtaining, by a resource manager executing on a processor of the heterogeneous computing environment, one or more attributes of at least one node of the plurality of nodes of the heterogeneous computing environment, the at least one node having a native architecture and supporting one or more non-native architectures, and wherein the one or more attributes specify the one or more non-native architectures supported by the at least one node, said one or more non-native architectures being different than said native architecture;
    receiving by the resource manager a request to be processed by the heterogeneous computing environment, said request having specific resource requirements associated therewith;
    selecting by the resource manager at least one processing node of the plurality of nodes to process the request, the selecting comprising:
        determining which one or more nodes of the plurality of nodes have a native architecture compatible with the specific resource requirements of the request or support, as indicated by the obtained one or more attributes, a non-native architecture compatible with the specific resource requirements of the request; and
        choosing from those one or more nodes that have a compatible native architecture or support a compatible non-native architecture the at least one processing node to process the request; and
    allocating one or more resources of the at least one processing node to the specific request to process the specific request.

2. The method of claim 1, wherein the specific request comprises a program to be executed.

3. The method of claim 1, wherein the obtaining comprises providing by the at least one node the one or more attributes to the resource manager.

4. The method of claim 3, wherein the providing of the one or more attributes by the at least one node to the resource manager is via one or more other resource managers coupled to the at least one node.

5. The method of claim 4, wherein the resource manager is a grid resource manager, and the one or more other resource managers comprise one or more cluster resource managers.

6. The method of claim 1, wherein the heterogeneous computing environment comprises a grid computing environment and said resource manager comprises a grid resource manager.

7. A computer system for facilitating allocation of resources in a heterogeneous computing environment comprising a plurality of nodes, the computer system comprising:
    a memory; and
    a processor in communications with the memory, wherein the computer system is capable of performing a method, said method comprising:
        obtaining, by a resource manager of the heterogeneous computing environment, one or more attributes of at least one node of the plurality of nodes of the heterogeneous computing environment, the at least one node having a native architecture and supporting one or more non-native architectures, and wherein the one or more attributes specify the one or more non-native architectures supported by the at least one node, said one or more non-native architectures being different than said native architecture;
        receiving by the resource manager a request to be processed by the heterogeneous computing environment, said request having specific resource requirements associated therewith;
        selecting by the resource manager at least one processing node of the nodes to process the selecting comprising:
            determining which one or more nodes of the plurality of nodes have a native architecture compatible with the specific resource requirements of the request or support, as indicated by the obtained one or more attributes, a non-native architecture compatible with the specific resource requirements of the request; and
            choosing from those one or more nodes that have a compatible native architecture or support a compatible non-native architecture the at least one processing node to process the request; and
        allocating one or more resources of the at least one processing node to the specific request to process the specific request.

8. The computer system of claim 7, wherein the specific request comprises a program to be executed.

9. The computer system of claim 7, wherein the obtaining comprises providing by the at least one node the one or more attributes to the resource manager.

10. The computer system of claim 9, wherein the providing of the one or more attributes by the at least one node to the resource manager is via one or more other resource managers coupled to the at least one node.

11. The computer system of claim 10, wherein the resource manager is a grid resource manager, and the one or more other resource managers comprise one or more cluster resource managers.

12. The computer system of claim 7, wherein the heterogeneous computing environment comprises a grid computing environment and said resource manager comprises a grid resource manager.

13. A computer program product for facilitating allocation of resources in a heterogeneous computing environment comprising a plurality of nodes, the computer program product comprising:

a storage device readable by a processor and storing instructions for execution by the processor for performing a method comprising:

obtaining, by a resource manager of the heterogeneous computing environment, one or more attributes of at least one node of the plurality of nodes of the heterogeneous computing environment, the at least one node having a native architecture and supporting one or more non-native architectures, and wherein the one or more attributes specify the one or more non-native architectures supported by the at least one node, said one or more non-native architectures being different than said native architecture;

receiving by the resource manager a request to be processed by the heterogeneous computing environment, said request having specific resource requirements associated therewith;

selecting by the resource manager at least one processing node of the plurality of nodes to process the request, the selecting comprising:

determining which one or more nodes of the plurality of nodes have a native architecture compatible with the specific resource requirements of the request or support, as indicated by the obtained one or more attributes, a non-native architecture compatible with the specific resource requirements of the request; and choosing from those one or more nodes that have a compatible native architecture or support a compatible non-native architecture the at least one processing node to process the request; and allocating one or more resources of the at least one processing node to the specific request to process the specific request.

14. The computer program product of claim 13, wherein the specific request comprises a program to be executed.

15. The computer program product of claim 13, wherein the obtaining comprises providing by the at least one node the one or more attributes to the resource manager.

16. The computer program product of claim 15, wherein the providing of the one or more attributes by the at least one node to the resource manager is via one or more other resource managers coupled to the at least one node.

17. The computer program product of claim 16, wherein the resource manager is a grid resource manager, and the one or more other resource managers comprise one or more cluster resource managers.

18. The computer program product of claim 13, wherein the heterogeneous computing environment comprises a grid computing environment and said resource manager comprises a grid resource manager.

* * * * *